US012415191B2

(12) United States Patent
Erickson et al.

(10) Patent No.: US 12,415,191 B2
(45) Date of Patent: Sep. 16, 2025

(54) STEAM EFFECT NOZZLE FOR ENTERTAINMENT VENUE

(71) Applicant: Universal City Studios LLC, Universal City, CA (US)

(72) Inventors: Christopher Erickson, Mendham, NJ (US); David Gerard Majdali, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 534 days.

(21) Appl. No.: 17/721,057

(22) Filed: Apr. 14, 2022

(65) Prior Publication Data

US 2022/0371029 A1 Nov. 24, 2022

Related U.S. Application Data

(60) Provisional application No. 63/191,539, filed on May 21, 2021.

(51) Int. Cl.
*B05B 1/02* (2006.01)
*A63J 5/02* (2006.01)
(Continued)

(52) U.S. Cl.
CPC ................. *B05B 1/02* (2013.01); *A63J 5/025* (2013.01); *B05B 9/002* (2013.01); *B05B 12/085* (2013.01); *A63J 5/023* (2013.01)

(58) Field of Classification Search
CPC ......... B05B 1/02; B05B 9/002; B05B 12/085; B05B 7/0012; B05B 14/00; A63J 5/025; A63J 5/023
See application file for complete search history.

(56) References Cited

U.S. PATENT DOCUMENTS 2,756,028 A 7/1956 Byerley
5,711,481 A 1/1998 MacDonald et al.
(Continued)

FOREIGN PATENT DOCUMENTS

CN 103016948 4/2013
CN 205322084 6/2016
(Continued)

OTHER PUBLICATIONS

TLV, "A Steam Specialist Company", Website: https://www.tlv.com/global/US/steam-theory/steam-lines-best-practices.html, 2022, pp. 1-7.

(Continued)

*Primary Examiner* — Qingzhang Zhou
*Assistant Examiner* — Joel Zhou
(74) *Attorney, Agent, or Firm* — Fletcher Yoder, PC

(57) ABSTRACT

A steam effect nozzle includes a housing section configured to receive a fluid having a mixture of steam and liquid condensate and baffles disposed in the housing section. The baffles are configured to separate the steam of the fluid from the liquid condensate of the fluid, enable the steam to travel from a first end wall of the housing section to a second end wall of the housing section, and bias the liquid condensate of the fluid toward a sloped lower surface of the housing section, the sloped lower surface sloping downwardly from the second end wall toward the first end wall. The steam effect nozzle also includes a nozzle outlet adjacent to the second end wall of the housing section, where the nozzle outlet is configured to output the steam to an external environment.

15 Claims, 3 Drawing Sheets

(51) Int. Cl.
*B05B 9/00* (2006.01)
*B05B 12/08* (2006.01)

(56) References Cited

U.S. PATENT DOCUMENTS

| | | | | |
|---|---|---|---|---|
| 6,328,233 | B1 * | 12/2001 | Moy | B05B 12/12 239/338 |
| 6,647,204 | B1 | 11/2003 | Hutchinson | |
| 7,637,699 | B2 | 12/2009 | Albrecht | |
| 8,122,856 | B2 | 2/2012 | Franke et al. | |

FOREIGN PATENT DOCUMENTS

| | | | |
|---|---|---|---|
| CN | 205480929 | | 8/2016 |
| EP | 0158038 | A1 | 10/1985 |
| EP | 0520711 | | 12/1992 |
| EP | 3181242 | A1 | 6/2017 |
| JP | H11285341 | A | 10/1999 |

OTHER PUBLICATIONS

PCT/US2022/028827 Invitation to Pay Additional Fees mailed Aug. 26, 2022.

* cited by examiner

STEAM EFFECT NOZZLE FOR ENTERTAINMENT VENUE

CROSS-REFERENCE TO RELATED APPLICATIONS

This application claims priority to and the benefit of U.S. Provisional Application No. 63/191,539, filed May 21, 2021, and entitled "STEAM EFFECT NOZZLE FOR ENTERTAINMENT VENUE," the disclosure of which is incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Entertainment venues, such as theme parks, amusement parks, theaters, movie theaters, stadiums, concert halls, and the like, have been created to provide guests with various immersive experiences. These entertainment venues may include show attractions (e.g., movies, plays, rides, games) that provide the guests with the immersive experiences. For example, a traditional show attraction may include a system configured to generate steam and output the steam (e.g., onto a stage or show platform) as an effect of the traditional show attraction. However, it is now recognized that traditional systems used for show attractions may output an undesirably large amount of liquid condensate instead of, or in addition to, the steam output, reducing a desired effect and/or increasing an amount of time, maintenance, and/or cost needed to remove the liquid condensate from various surfaces (e.g., of the stage or show platform). Further, certain traditional systems used for show attractions may include chemicals other than water to generate a vaporous fluid (e.g., synthetic steam) that leaves an undesirable chemical residue on various surfaces (e.g., of the stage or show platform), increasing an amount of time, maintenance, and/or cost needed to remove the chemical residue from the various surfaces. Accordingly, it is now recognized that improved steam generation and output componentry for show attractions are desired.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from embodiments set forth below.

In an embodiment, a steam effect nozzle includes a housing section configured to receive a fluid having a mixture of steam and liquid condensate and baffles disposed in the housing section. The baffles are configured to separate the steam of the fluid from the liquid condensate of the fluid, enable the steam to travel from a first end wall of the housing section to a second end wall of the housing section, and bias the liquid condensate of the fluid toward a sloped lower surface of the housing section, the sloped lower surface sloping downwardly from the second end wall toward the first end wall. The steam effect nozzle also includes a nozzle outlet adjacent to the second end wall of the housing section, where the nozzle outlet is configured to output the steam to an external environment.

In an embodiment, a steam effect nozzle includes an inlet section configured to receive a fluid, a housing section fluidly coupled to the inlet section at a first end wall of the housing section, and a baffles disposed in the housing section and configured to separate a steam of the fluid from a liquid condensate of the fluid. The steam effect nozzle also includes a steam outlet section coupled to the housing section at a second end wall of the housing section opposing the first end wall of the housing section. The steam outlet section includes a nozzle outlet formed therein and the nozzle outlet is configured to output the steam to an external environment. The steam effect nozzle also includes a condensate outlet section extending from the housing section between the first end wall of the housing section and the second end wall of the housing section. The condensate outlet section is configured to drain the liquid condensate from the housing section.

In an embodiment, a steam output system includes a steam generation and transport assembly having a steam effect valve and configured to generate a fluid having a mixture of steam and liquid condensate. The steam output system also includes a steam effect nozzle coupled to the steam generation and transport assembly downstream from the steam effect valve relative to a flow of the fluid. The steam effect nozzle includes a baffle configured to separate the steam of the fluid from the liquid condensate of the fluid such that the liquid condensate is drained from the steam effect nozzle and the steam is output from the steam effect nozzle toward an external environment. The steam output system also includes a controller having a processor and a memory, the memory storing instructions thereon that, when executed by the processor, cause the controller to block the flow of the fluid toward the steam effect nozzle such that a pressure of the fluid is increased, and enable the flow of the fluid into the steam effect nozzle such that the pressure of the fluid biases the fluid through the steam effect nozzle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
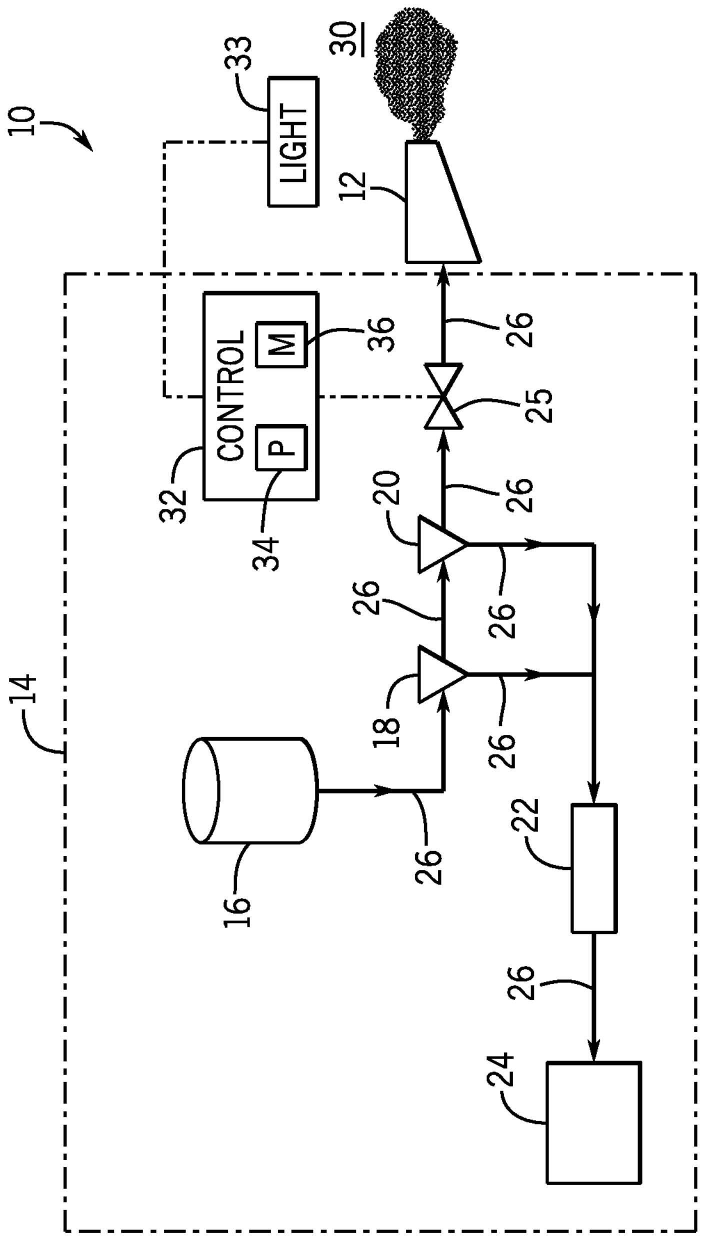
FIG. 1 is a schematic illustration of a steam generation system having a steam effect nozzle for use in a show attraction, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a show attraction of an entertainment venue and, more particularly, to a steam effect nozzle configured to output steam for the show attraction. For example, the present disclosure is directed to a steam effect nozzle that separates a liquid condensate of a fluid from a steam of the fluid, drains the liquid condensate, and outputs the steam into a show attraction space (e.g., above a stage or show platform).

In accordance with an embodiment of the present disclosure, the steam effect nozzle may include an inlet section configured to receive a fluid (e.g., having liquid condensate and steam) and a housing section coupled to the inlet section and configured to receive the fluid from the inlet section. The inlet section, for example, may be coupled to a pipe of a steam generation and transport assembly. The steam effect nozzle also includes one or more baffles disposed in the housing section and configured to coordinate to separate the liquid condensate of the fluid from the steam of the fluid by slowing fluid flow through the steam effect nozzle, which allows the liquid condensate to fall out of the fluid and be routed by gravity (e.g., toward a condensate outlet section) rather than pushed through the steam effect nozzle (e.g., toward a steam outlet section) along with the steam. For example, the baffles may be arranged to enable the steam to pass over a top of the baffles, relative to a gravity vector, and to cause the liquid condensate to fall downwardly toward a sloped lower surface of the housing section that gravity feeds the liquid condensate toward the condensate outlet section.

The condensate outlet section of the steam effect nozzle may be coupled to the housing section and configured to drain the liquid condensate therefrom. Further, the steam outlet section may be coupled to the housing section and configured to output the steam into a show attraction space, such as above a stage or show platform of the show attraction. That is, the show attraction space may be an environment external to the steam effect nozzle and viewable by an audience of the show attraction. Output of the steam from the steam effect nozzle may be controlled to coincide with various elements of the show attraction. For example, output of the steam from the steam effect nozzle may be controlled via a steam effect valve that is triggered by a controller to release the steam at a particular moment during the show attraction, such as from the mouth of a dragon that appears at a particular interval or moment of the show attraction. That is, the steam may simulate smoke being emitted from the mouth of the dragon, while other show effects (e.g., lighting effects) may be used to simulate fire being emitted by the mouth of the dragon. By reducing or eliminating liquid emission along with the steam, other devices, such as lighting, may be protected from damage or maintenance issues related to the liquid being expelled around the steam effect nozzle.

The housing section of the steam effect nozzle may include a geometry that promotes draining of the liquid condensate through the condensate outlet section. For example, when the steam effect nozzle is in an installed condition and/or in operation, the housing section may include a sloped lower surface that slopes downwardly toward the condensate outlet section and gravity feeds the liquid condensate toward the condensate outlet section. The term "lower" in sloped lower surface is intended to refer to a position and/or orientation of the sloped lower surface (relative to gravity) when the steam effect nozzle is in the installed condition and/or in operation.

Further, the baffles disposed in the housing section may be sized, shaped, and/or positioned to promote separation of the liquid condensate of the fluid from the steam of the fluid, and to guide of the liquid condensate toward the above-described sloped lower surface. For example, a first baffle may be disposed toward an upper area of the housing section (e.g., relative to the sloped lower surface) such that flow of the fluid in the upper area is separated into liquid condensate and steam, and a second baffle may be disposed toward a lower area of the housing section (e.g., relative to the sloped lower surface) such that flow of the fluid in the lower area is separated into liquid condensate and steam. Because the liquid condensate of the fluid may include a higher density than the steam of the fluid, the first and second baffles may block the liquid condensate from flowing toward and through the steam outlet section and guide the liquid condensate toward the above-described sloped lower surface. The relatively less dense steam of the fluid may travel around the first and second baffles toward and through the steam outlet section. The above-described steam effect valve may be controlled to increase a pressure of the fluid prior to the fluid entering the steam effect nozzle, where the increased pressure is used to convey the fluid through the steam effect nozzle and toward the steam outlet section of the steam effect nozzle.

Further, at least one baffle may be coupled to the above-described sloped lower surface (e.g., adjacent the steam outlet section of the steam effect nozzle) and may include a passage, such as a slot, therethrough. This baffle may be disposed, for example, adjacent an end wall of the housing section of the steam effect nozzle, where the end wall may be coupled to the steam outlet section of the steam effect nozzle. The passage through this baffle may enable any liquid condensate gathered between the baffle and the end wall of the housing section to travel from a first side of the baffle facing the end wall and the steam outlet section, through the passage, to a second side of the baffle facing the condensate outlet section, and along the sloped lower surface toward and into the condensate outlet section.

In an embodiment of the present disclosure, the steam effect nozzle may be configured to output steam formed only by heated water (e.g., where the water is heated via a boiler). Accordingly, the steam output by the steam effect nozzle does not leave an undesirable chemical residue on various surfaces (e.g., of a stage or show platform) receiving the steam output, thereby reducing an amount of time, maintenance, and/or cost relative to traditional embodiments employing chemicals other than water. Further, the above-described configuration of the steam effect nozzle, elaborated upon below with reference to the drawings, may reduce or negate an amount of liquid condensate (e.g., liquid water) output by the steam effect nozzle relative to traditional embodiments, thereby reducing an amount of time, maintenance, and/or cost required to remove the liquid condensate (e.g., liquid water) from various surfaces receiving the steam output. These and other features are described in detail below with reference to the drawings.

Continuing with the drawings, FIG. 1 is a schematic illustration of an embodiment of a steam output system 10 having a steam effect nozzle 12 coupled to a steam generation and transport assembly 14. The steam output system 10 may be used in a show attraction to generate a steam output coordinated with the show attraction to give a desired effect to an audience of the show attraction. The steam generation and transport assembly 14 of the steam output system 10 may include a boiler 16, a first steam separator 18, a second steam separator 20, a steam trap 22, a cooling box 24, and a steam effect valve 25. The steam generation and transport assembly 14 also includes piping 26 disposed between the above-described components as illustrated in FIG. 1. The boiler 16 may be configured to heat a liquid (e.g., water) to generate steam or a two-phase fluid having steam and liquid condensate.

The fluid output by the boiler 16 may be transported through the piping 26 toward a series of steam separators 18, 20. As the fluid travels through the piping 26, pressure loss of the fluid may cause some of the steam of the fluid to condense into liquid condensate. The steam separators 18, 20 may be employed to separate the steam and the liquid condensate, to pass the steam toward the steam effect valve 25 and the steam effect nozzle 12, and to drain the liquid condensate toward the steam trap 22. The steam trap 22 is configured to discharge the liquid condensate toward the cooling box 24. In an embodiment of the present disclosure, the cooling box 24 may direct the liquid condensate back to the boiler 16 for heating as described above. While the illustrated embodiment includes the first steam separator 18 and the second steam separator 20, it should be noted that fewer or more steam separators may be used depending on the distance between the boiler 16 and the steam effect valve 25 or the steam effect nozzle 12. Indeed, the boiler 16 may be disposed a sufficient distance from the steam effect nozzle 12 and a show space 30 (e.g., above a stage or show platform) receiving the steam effect from the steam effect nozzle 12, such that heat associated with the boiler 16 does not substantially affect an environment in the show space 30. In some embodiments, one or more supplemental heaters (e.g., an electric heating coil or heat exchanger) may be disposed along the route (e.g., piping 26) to maintain or boost temperature of the fluid and limit liquid production or separation.

The steam effect valve 25 of the steam generation and transport assembly 14 may be configured to selectively block a flow of the fluid through the piping 26 and toward the steam effect nozzle 12, and to selectively enable the flow of the fluid toward the steam effect nozzle 12. When the steam effect valve 25 selectively blocks the flow of the fluid toward the steam effect nozzle 12, a pressure of the fluid may be increased. When the steam effect valve 25 selectively enables the flow of the fluid into the steam effect nozzle 12, the increased pressure of the fluid may bias the fluid through the steam effect nozzle 12 and toward the show space 30. The steam effect valve 25 may be controlled via a controller 32 that actuates the steam effect valve 25 to open or close the flow path through the piping 26 toward the steam effect nozzle 12, as described above. The controller 32 may include a processor 34 and a memory 36, where the memory 36 stores instructions thereon that, when executed by the processor 34, causes the controller 32 to instruct the steam effect valve 25 to open or close the flow path through the piping 26 adjacent the steam effect nozzle 12 at certain intervals. For example, a schedule may be stored to the memory 36 of the controller 32, and the controller 32 may be configured to instruct various components (e.g., the steam effect valve 25, lighting effects) to actuate in response to various time periods or intervals in the schedule.

The controller 32 may selectively open the steam effect valve 25 to cause a flow of the fluid to the steam effect nozzle 12, which outputs steam into the show space 30 (e.g., above a stage or show platform) to cause a steam effect coordinated (e.g., by the controller 32) with elements of the show attraction. In an embodiment, the steam effect may be output from the steam effect nozzle 12 disposed in a mouth of a dragon to give the impression that the dragon is breathing smoke at a particular coordinated interval of the show attraction. Further, lighting or other effects may be controlled by the controller 32. For example, the controller 32 may control lights 33 to simulate fire emanating from the mouth of a dragon, and the controller 32 may control the steam effect valve 25 to simulate, via the steam effect nozzle 12, smoke emanating from the mouth of the dragon. In some embodiments, the controller 32 may instruct the steam effect valve 25 and the lights 33 to cause simulation of the fire and smoke at the same time and in response to a schedule stored to the memory 36 of the controller 32. Further, the controller 32 may instruct the steam effect valve 25 at a first period of time or moment and the lights 33 at a second period of time or moment different than the first period of time or moment, again in response to a schedule stored to the memory 36 of the controller 32. For example, the controller 32 may instruct the lights 33 to simulate fire at a first moment. Then, the controller 32 may instruct the steam effect valve 25 to open at a second moment different than the first moment such that the fluid is passed to the steam effect nozzle 12 and smoke is simulated via the steam output of the steam effect nozzle 12. Other effects and componentry are also possible, including auditory componentry such as a speaker.

As will be appreciated in view of FIGS. 2-6 below, the steam effect nozzle 12 may include certain features that efficiently separate steam of the fluid received by the steam effect nozzle 12 from liquid condensate of the fluid received by the steam effect nozzle 12, and allow for the liquid condensate to be drained from the steam effect nozzle 12 such that the steam can be output by the steam effect nozzle 12 into the show space 30 without substantial entrained liquid. That is, the steam effect nozzle 12 may be configured to output a “drier steam” than would otherwise be possible without the steam effect nozzle 12. By removing liquid condensate and outputting a drier steam, the desired effect may be improved and/or time, maintenance, and/or cost associated with cleaning liquid condensate from surfaces defining the show space 30 may be reduced or negated between iterations of the show attraction employing the steam output system 10.

Figure 2:
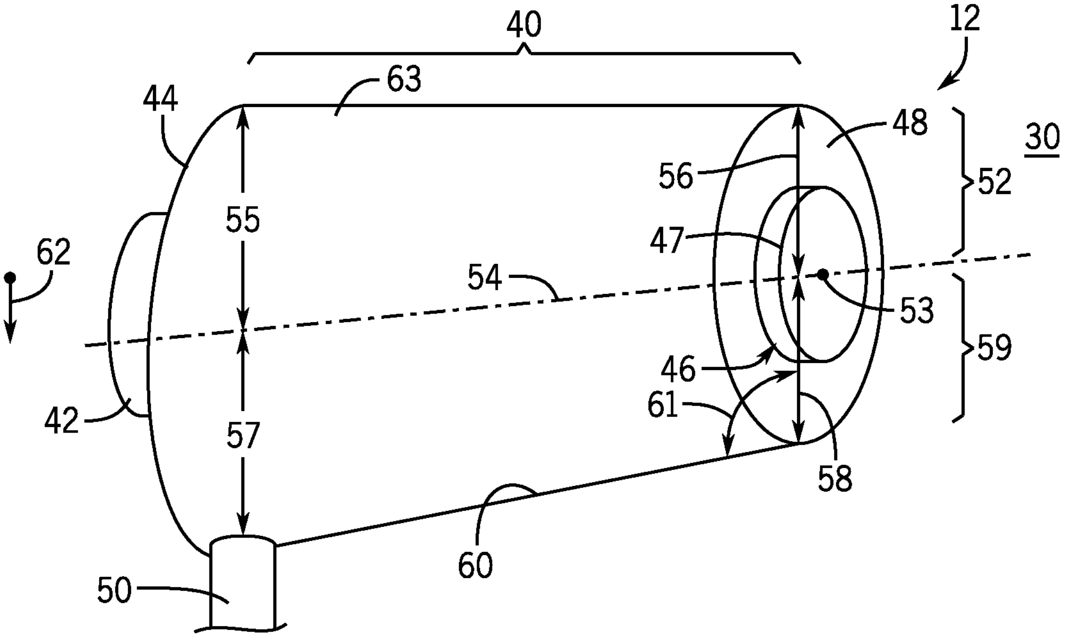
FIG. 2 is perspective view of the steam effect nozzle of FIG. 1 having a housing section forming an asymmetrical truncated cone, in accordance with an aspect of the present disclosure.

FIG. 2 is perspective view of an embodiment of the steam effect nozzle 12 of FIG. 1 having a housing section 40 that forms an asymmetrical truncated cone. The steam effect nozzle 12 also includes an inlet section 42 coupled to a first end wall 44 of the housing section 40, a steam outlet section 46 coupled to a second end wall 48 of the housing section 40, and a condensate outlet section 50 coupled to the housing section 40. In an embodiment, the steam effect nozzle 12 may not include the inlet section 42, the steam outlet section 46, and the condensate outlet section 50, and instead may merely include inlet/outlet openings disposed directly in the housing section 40.

In the illustrated embodiment, the inlet section 42 may be configured to couple to, and receive a fluid from, the piping 26 of the steam generation and transport assembly 14 of FIG. 1 (e.g., downstream from the steam effect valve 25 illustrated in FIG. 1). The housing section 40 may guide and facilitate transport of portions of the fluid from the inlet section 42 toward the steam outlet section 46, which is configured to output a steam of the fluid through a nozzle outlet 47 (e.g., formed in the steam outlet section 46) of the steam effect nozzle 12 and into the show space 30 (e.g., above a stage or show platform). In an embodiment of the present disclosure, the steam effect nozzle 12 may not include the steam outlet section 46, and the nozzle outlet 47 may be formed directly in the second end wall 48 of the housing section 40. As described in detail below, the housing section 40, and components internal to the housing section 40, may be configured to separate the steam of the fluid received by the inlet section 42 from a liquid condensate of the fluid received by the inlet section 42, and to guide the liquid condensate toward the condensate outlet section 50.

In the embodiment illustrated in FIG. 2, the housing section 40 includes a shape resembling an asymmetrical truncated cone. For example, the illustrated steam effect nozzle 12 is oriented (e.g., in an installed or operating condition) such that a portion 52 of the housing section 40 extending above (e.g., relative to a gravity vector 62) an axis 54 through a center 53 of the steam outlet section 46 (along a general direction of flow) resembles a half of a cylinder. Further, the steam effect nozzle 12 is oriented such that an additional portion 59 of the housing section 40 extending below (e.g., relative to the gravity vector 62) the axis 54 resembles a half of a truncated cone. Together, the portion 52 and the additional portion 59 form the above-described asymmetric truncated cone. Put differently, in the portion 52 of the housing section 40 above the axis 54, a first radius 55 at the first end wall is substantially equal to a second radius 56 at the second end wall 48, whereas in the additional portion 59 of the housing section below the axis 54, a third radius 57 at the first end wall 44 is greater than a fourth radius 58 at the second end wall 48. The difference between the third radius 57 and the fourth radius 58 may be enabled by a sloped lower surface 60 of the additional portion 59 of the housing section 40, which slopes downwardly from the second end wall 48 toward the first end wall 44 (e.g., to the condensate outlet section 50). In other words, the second end wall 48 and the sloped lower surface 60 may form an obtuse angle 61 therebetween. The sloped lower surface 60 may be referred to as a "lower" surface in relation to its position relative to the gravity vector 62 when the steam effect nozzle 12 is in an installed (or operating) condition. In contrast, the illustrated embodiment includes an upper surface 63 that extends generally parallel to the axis 54.

The orientation of the steam effect nozzle 12 relative to the gravity vector 62, in addition to components internal to the housing section 40 and described in detail with reference to later drawings, may cause liquid condensate of the fluid received by the housing section 40 (e.g., via the inlet section 42) to fall toward the sloped lower surface 60 of the housing section 40. For example, flow of the relatively dense liquid condensate through the housing section 40 may be blocked by the components internal to the housing section 40 such that gravity causes the liquid condensate to fall toward the sloped lower surface 60. Further, the sloped lower surface 60 may guide the liquid condensate (e.g., via gravity) toward the condensate outlet section 50 of the steam effect nozzle 12. Steam of the fluid received by the housing section 40 (e.g., via the inlet section 42), which is less dense than the liquid condensate, may be biased by pressure exerted or enabled by the steam effect valve 25 illustrated in FIG. 1. The pressure may cause the steam, which is less dense than the liquid condensate, to travel around (e.g., over) the internal components in the housing section 40, toward and through the nozzle outlet 47 formed in the steam outlet section 46 of the steam effect nozzle 12, and into the show space 30 (e.g., above a stage or show platform). By employing substantially straighter walls or surfaces in the upper portion 52 (e.g., via the cylindrical shape), the steam in the fluid (which will typically rise relative to liquid droplets) has a more direct path to the steam outlet section 46, which may avoid or limit undesired condensation from being output by the steam outlet section 46 through the nozzle outlet 47.

Figure 3:
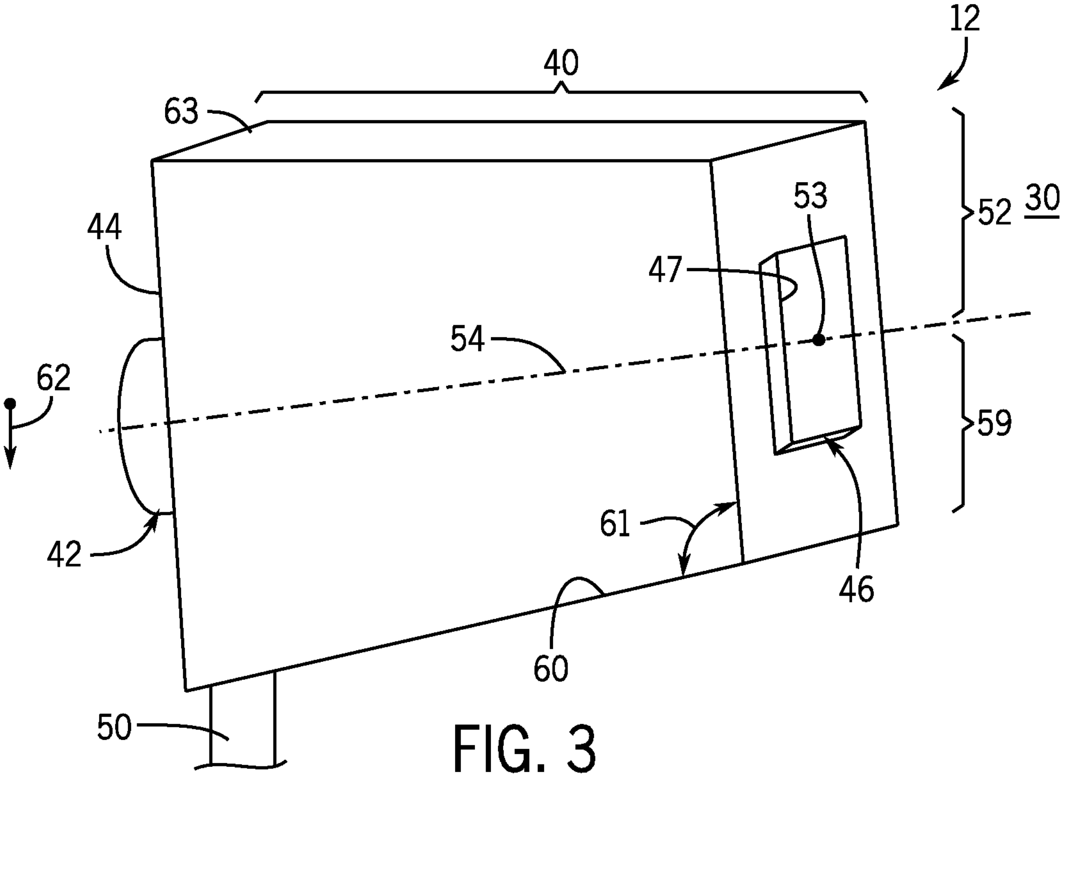
FIG. 3 is a perspective view of the steam effect nozzle of FIG. 1 having a housing section forming a trapezoidal prism, in accordance with an aspect of the present disclosure.

It should be noted that the housing section 40 may include a shape other than the above-described asymmetric truncated cone, such as a symmetric truncated cone, an oblique cylinder, or rectilinear shapes (e.g., rectilinear prisms). For example, FIG. 3 is a perspective view of an embodiment of the steam effect nozzle 12 of FIG. 1 having the housing section 40 forming a trapezoidal prism. In the illustrated embodiment, the housing section 40 includes the first end wall 44 forming a rectangular shape and the second end wall 48 forming another rectangular shape. The rectangular shape of the second end wall 48 is smaller than the rectangular shape of the first end wall 44. The steam effect nozzle 12 includes the axis 54 extending through the center 53 of the steam outlet section 46. The portion 52 of the housing section 40 above the axis 54 may resemble a half of a rectangular prism, whereas the additional portion 59 of the housing section 40 below the axis 54 may resemble a half of a truncated trapezoidal or triangular prism. Together, the portion 52 and the additional portion 59 form a trapezoidal prism. The additional portion 59 is defined at least in part by the sloped lower surface 60 forming the obtuse angle 61 with the second end wall 48 of the steam effect nozzle 12. In contrast, the upper surface 63 may extend parallel to the axis 54 through the center 53 of the steam outlet section 46. Like the embodiment of the steam effect nozzle 12 illustrated in FIG. 2, the embodiment of the steam effect nozzle 12 illustrated in FIG. 3 may include components internal to the housing section 40 that cause the liquid condensate of the fluid received by the inlet section 42 and passed to the housing section 40 to flow downwardly (e.g., relative to the gravity vector 62) toward the sloped lower surface 60. The sloped lower surface 60 may guide the liquid condensate toward and into the condensate outlet section 50.

Figure 4:
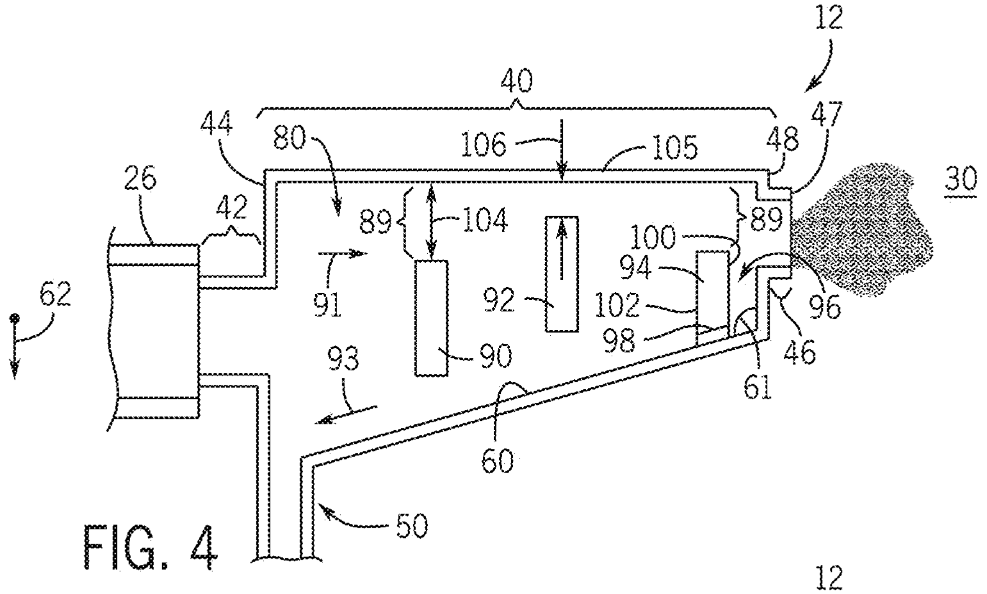
FIG. 4 is a cross-sectional view of an embodiment of the steam effect nozzle of FIG. 1, in accordance with an aspect of the present disclosure.
Figure 5:
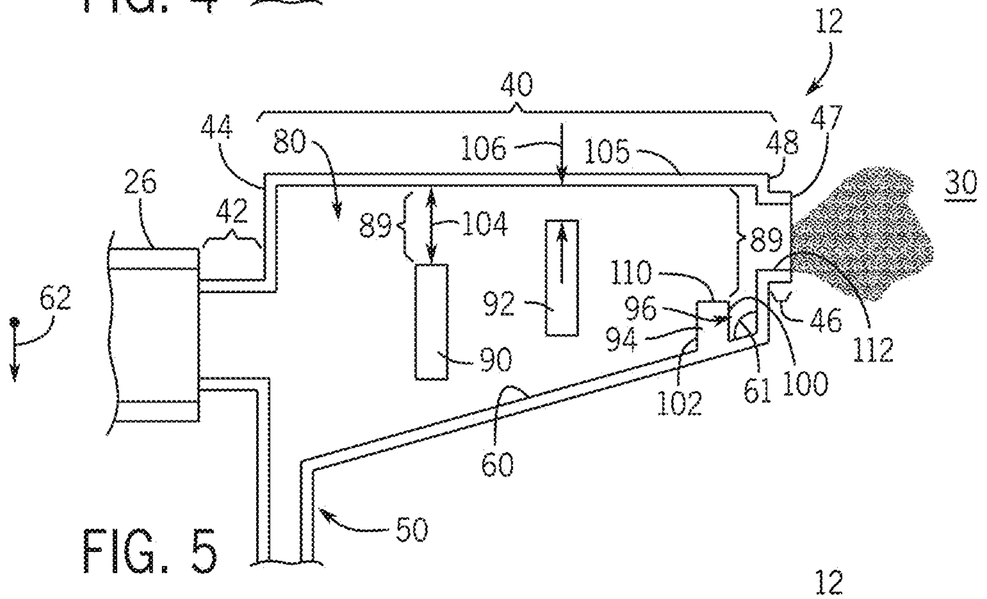
FIG. 5 is a cross-sectional view of an embodiment of the steam effect nozzle of FIG. 1, in accordance with an aspect of the present disclosure.
Figure 6:
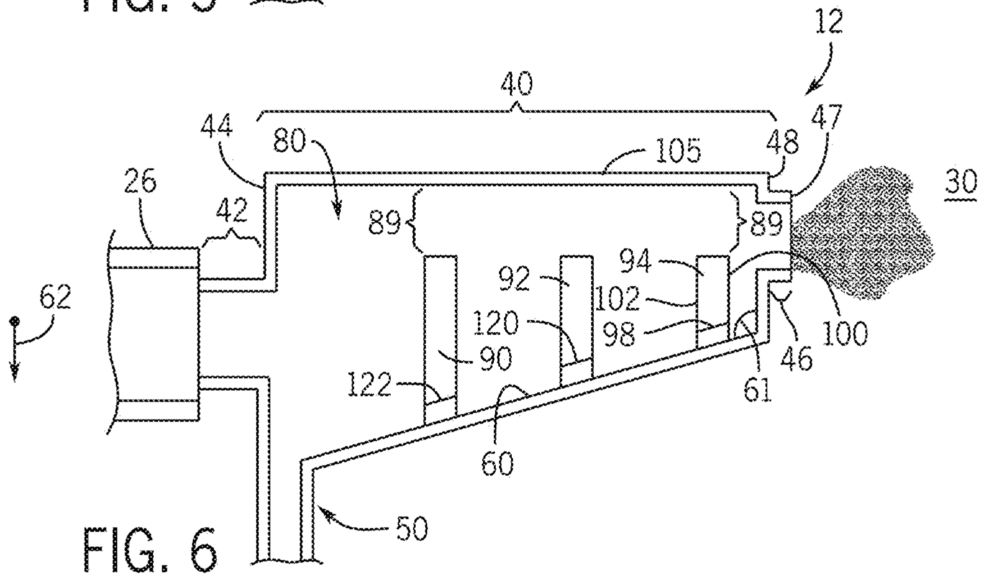
FIG. 6 is a cross-sectional view of an embodiment of the steam effect nozzle of FIG. 1, in accordance with an aspect of the present disclosure.

As described above, components internal to the housing section 40 of the steam effect nozzle 12 may block a flow of the relatively dense liquid condensate toward the steam outlet section 46, causing the liquid condensate to fall toward the sloped lower surface 60. FIGS. 4-6, described in detail below, illustrate various embodiments of the above-described components internal to the housing section 40 of the steam effect nozzle 12.

For example, FIG. 4 is a cross-sectional view of an embodiment of the steam effect nozzle 12 of FIG. 1. In the illustrated embodiment, the steam effect nozzle 12 includes an internal volume 80 defined by the inlet section 42, the housing section 40, the steam outlet section 46, and the condensate outlet section 50. The internal volume may receive a fluid from the piping 26 (e.g., of the steam generation and transport assembly 14 of FIG. 1). The fluid may include steam and liquid condensate. As previously described, the housing section 40 of the steam effect nozzle 12 may include internal features configured to separate the liquid condensate from the steam. For example, as shown, the steam effect nozzle 12 includes a first baffle 90, a second baffle 92, and a third baffle 94 disposed within the housing section 40.

Each of the baffles 90, 92, 94 is configured to block a flow of the liquid condensate toward the steam outlet section 46 of the steam effect nozzle 12. For example, the liquid condensate of the fluid received by the steam effect nozzle 12 may include a higher density than the steam of the fluid received by the steam effect nozzle 12. When the relatively dense liquid condensate approaches the baffles 90, 92, 94, the baffles 90, 92, 94 may block the flow of the relatively dense liquid condensate, causing the relatively dense liquid condensate to fall toward the sloped lower surface 60 of the housing section 40 of the steam effect nozzle 12 while the steam readily passes over. The term “lower” in the sloped lower surface 60 is intended to refer to a position and/or an orientation of the sloped lower surface 60 when the steam effect nozzle 12 is in the installed condition and/or in operation. That is, when the steam effect nozzle 12 is in the installed condition and/or in operation, the sloped lower surface 60 may be beneath the baffles 90, 92, 94 relative to the gravity vector 62. Accordingly, when the baffles 90, 92, 94 block the flow of the liquid condensate toward the steam outlet section 46, gravity may act upon the liquid condensate and cause the liquid condensate to fall toward and onto the sloped lower surface 60.

Further, the sloped lower surface 60 is sloped downwardly from the second end wall 48 (e.g., adjacent the steam outlet section 46) toward the condensate outlet section 50 proximate the first end wall 44 (e.g., adjacent the inlet section 42). Indeed, the sloped lower surface 60 forms the obtuse angle 61 with the second end wall 48. Because of these features, the steam effect nozzle 12 promotes capture of the liquid condensate and then flow of the liquid condensate toward and into the condensate outlet section 50, which drains the liquid condensate from the steam effect nozzle 12.

The steam of the fluid received by the steam effect nozzle 12 includes a relatively low density compared to the above-described liquid condensate. Accordingly, the steam of the fluid may readily travel around the baffles 90, 92, 94 (e.g., above the baffles 90, 92, 94 and through a gap 89 illustrated in FIGS. 4-6 between top surfaces of the baffles 90, 92, 94 and an upper surface 105 of the housing section 40) toward and through the nozzle outlet 47 formed in the steam outlet section 46. As previously described, the steam effect valve 25 illustrated in FIG. 1 may bias travel of the fluid through the steam effect nozzle 12 and toward the steam outlet section 46. For example, the steam effect valve 25 illustrated in FIG. 1 may be actuated to selectively block the fluid from entering the steam effect nozzle 12, which increases a fluid pressure upstream of the steam effect valve 25 illustrated in FIG. 1. When the steam effect valve 25 illustrated in FIG. 1 is actuated to selectively enable the fluid to enter the steam effect nozzle 12, the above-described fluid pressure may bias the fluid through the steam effect nozzle 12 and toward the steam outlet section 46. As the fluid travels through the steam effect nozzle 12, the baffles 90, 92, 94 bias the liquid condensate toward the sloped lower surface 60, as described above, which gravity feeds the liquid condensate to the condensate outlet section 50. In this way, a flow direction 91 of the steam through the steam effect nozzle 12 may oppose a flow direction 93 of the liquid condensate along the sloped lower surface 60. Accordingly, the steam outlet section 46 generally receives the steam of the fluid received by the steam effect nozzle 12 and the condensate outlet section 50 generally receives the liquid condensate of the fluid received by the steam effect nozzle 12.

The third baffle 94 in the illustrated embodiment is coupled to the sloped lower surface 60 of the housing section 40 and separated from the second end wall 48 of the housing section 40 by a space 96. As shown, the third baffle 94 may include a passage 98 (e.g., one or more slots or openings) adjacent the sloped lower surface 60. Accordingly, any liquid condensate that gathers in the space 96 between the third baffle 94 and the second end wall 48 of the housing section 40 may be drained through the passage 98 and toward the condensate outlet section 50. That is, the passage 98 may enable the liquid condensate to flow from a first side 100 of the third baffle 94 facing the second end wall 48 of the housing section 40 of the steam effect nozzle 12, through the third baffle 94, and to a second side 102 of the third baffle 94 facing the first end wall 44 of the housing section 40 of the steam effect nozzle 12.

The first baffle 90 and the second baffle 92 may be positioned to separate the liquid condensate from the steam of the fluid received by the steam effect nozzle 12 at various regions within the inner volume 80. For example, in the illustrated embodiment of FIG. 4, the first baffle 90 is positioned a first distance 104 from the upper surface 105 of the housing section 40, the second baffle 92 is positioned a second distance 106 from the upper surface 105 of the housing section 40, and the first distance 104 is greater than the second distance 106. Thus, fluid flow including liquid condensate that more easily flows over the first baffle 90 may still be engaged and captured by interfacing with the second baffle 92.

Other baffle configurations are also possible. For example, FIG. 5 is a cross-sectional view of an embodiment of the steam effect nozzle 12 of FIG. 1. In FIG. 5, the third baffle 94 does not include the passage 98 included in the embodiment illustrated in FIG. 4. However, in the embodiment in FIG. 5, the third baffle 94 is sized such that any liquid condensate gathered in the space 96 between the third baffle 94 and the second end wall 48 of the housing section 40 does not spill through the nozzle outlet 47 formed in the steam outlet section 46 and into the space 30. For example, a top 110 of the third baffle 94 in the illustrated embodiment is lower, relative to the gravity vector 62, than a bottom 112 of the steam outlet section 46. Accordingly, any liquid condensate gathered in the space 96 will spill over the top 110 of the third baffle 94 and onto the sloped lower surface 60 adjacent the second side 102 of the third baffle 94 facing the first end wall 44 of the housing section 40, enabling the sloped lower surface 60 to guide the liquid condensate toward the condensate outlet section 50.

Still other baffle configurations are also possible. FIG. 6 is a cross-sectional view of an embodiment of the steam effect nozzle 12 of FIG. 1. In the illustrated embodiment, all three of the baffles 90, 92, 94 are coupled to the sloped lower surface 60. As previously described, the baffle 94 closest to the second end wall 48 of the housing section 40 includes the passage therethrough 98. Further, the baffle 92 includes a passage 120 therethrough, and the baffle 90 includes a passage 122 therethrough. Accordingly, the liquid condensate can travel along the sloped lower surface 60 through the passage 98, the passage 120, and/or the passage 122, and toward and into the condensate outlet section 50.

It should be noted that, in each of the embodiments illustrated in FIGS. 4-6, the steam outlet section 46 of the steam effect nozzle 12 is offset from the inlet section 42 of the steam effect nozzle 12 relative to the gravity vector 62. For example, as shown in FIGS. 4-6, the steam outlet section 46 is positioned higher than the inlet section 42 relative to the gravity vector 62. As previously described, the steam of the fluid received by the inlet section 42 may tend to rise or pass through upper portions of the steam effect nozzle 12 (e.g., above the baffles 90, 92, 94). By elevating the steam outlet section 46 (e.g., positioning the steam outlet section 46 higher than the inlet section 42 relative to the gravity vector 62), the steam of the fluid may be directed toward and through the steam outlet section 46. In contrast, the liquid condensate of the fluid may be directed away from the steam outlet section 46 (e.g., toward lower portions of the steam effect nozzle 12 and onto the sloped lower surface 60).

The above-described steam output system and corresponding steam effect nozzle may reduce or negate an amount of liquid condensate (e.g., liquid water) output by the steam effect nozzle relative to traditional embodiments, thereby reducing an amount of time, maintenance, and/or cost required to remove the liquid condensate (e.g., liquid water) from various surfaces receiving the steam output. Further, the steam output may be drier than traditional show attraction embodiments, which may improve a desired effect of the steam output. Further still, the steam output may be composed of water that is cleaner than traditional embodiments employing other chemicals that leave a chemical residue on surfaces receiving the fluid output, thereby reducing an amount of time, maintenance, and/or cost required to remove the chemical residue from the surfaces.

While only certain features have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A steam effect nozzle, comprising:

a housing section configured to receive a fluid having a mixture of steam and liquid condensate;

a plurality of baffles disposed in the housing section and configured to separate the steam of the fluid from the liquid condensate of the fluid, enable the steam to travel transverse to a gravity vector from a first end wall of the housing section to a second end wall of the housing section, and bias the liquid condensate toward a sloped lower portion of the housing section, the sloped lower portion sloping downwardly relative to the gravity vector from the second end wall toward the first end wall;

a gap between an upper portion of the housing section and a plurality of top surfaces of the plurality of baffles, wherein the upper portion of the housing section opposes the sloped lower portion of the housing section, and the upper portion is positioned above the sloped lower portion relative to the gravity vector; and a nozzle outlet adjacent to the second end wall of the housing section, wherein the nozzle outlet is configured to output the steam to an external environment.

2. The steam effect nozzle of claim 1, comprising a condensate outlet section coupled to the housing section, wherein the condensate outlet section is configured to receive the liquid condensate from the sloped lower portion and drain the liquid condensate from the housing section.

3. The steam effect nozzle of claim 1, comprising a steam outlet section coupled to the second end wall and having the nozzle outlet formed therein, wherein the steam outlet section is configured to receive the steam from the housing section and output the steam through the nozzle outlet and to the external environment.

4. The steam effect nozzle of claim 1, comprising an inlet section coupled to the first end wall of the housing section, wherein the inlet section is configured to receive the fluid and pass the fluid to the housing section.

5. The steam effect nozzle of claim 1, wherein a baffle of the plurality of baffles is coupled to the sloped lower portion.

6. The steam effect nozzle of claim 5, wherein the baffle of the plurality of baffles comprises a passage therethrough and adjacent to the sloped lower portion, and wherein the passage is configured to enable the liquid condensate to flow from a first side of the baffle of the plurality of baffles facing the second end wall, through the passage, and to a second side of the baffle of the plurality of baffles facing the first end wall.

7. The steam effect nozzle of claim 1, wherein the housing section comprises an asymmetric truncated cone shape or a trapezoidal prism shape.

8. The steam effect nozzle of claim 1, wherein the sloped lower portion forms an obtuse angle with the second end wall.

9. A steam effect nozzle, comprising:

an inlet section configured to receive a fluid having a mixture of steam and liquid condensate;

a housing section fluidly coupled to the inlet section at a first end wall of the housing section;

a plurality of baffles disposed in the housing section and configured to separate the steam of the fluid from the liquid condensate of the fluid such that the steam travels transverse to a gravity vector from the first end wall of the housing section to a second end wall of the housing section opposing the first end wall of the housing section;

a steam outlet section coupled to or integrated with the housing section at the second end wall of the housing section, wherein the steam outlet section comprises a nozzle outlet formed therein and the nozzle outlet is configured to output the steam to an external environment, wherein a baffle of the plurality of baffles is positioned closest to the steam outlet section, and wherein a top surface of the baffle of the plurality of baffles is positioned underneath a bottom surface of the nozzle outlet relative to the gravity vector; and a condensate outlet section extending from the housing section adjacent to the first end wall of the housing section, wherein the condensate outlet section is configured to drain the liquid condensate from the housing section.

10. The steam effect nozzle of claim 9, wherein the housing section comprises a sloped lower portion forming an obtuse angle with the second end wall, and wherein the sloped lower portion slopes downwardly from the second end wall to the condensate outlet section such that the sloped lower portion is configured to gravity feed the condensate toward the condensate outlet section.

11. The steam effect nozzle of claim 10, wherein the baffle of the plurality of baffles is coupled to the sloped lower portion.

12. The steam effect nozzle of claim 11, wherein the baffle of the plurality of baffles is disposed closer to the steam outlet section than the condensate outlet section.

13. The steam effect nozzle of claim 11, comprising a fluid passage formed in the baffle of the plurality of baffles and adjacent to the sloped lower portion, wherein the fluid passage is configured to enable the liquid condensate to flow from a first baffle side of the baffle of the plurality of baffles facing the second end wall, through the fluid passage, and to a second baffle side of the baffle of the plurality of baffles facing the first end wall.

14. The steam effect nozzle of claim 10, wherein the top surface of the baffle of the plurality of baffles extends perpendicular to the gravity vector.

15. The steam effect nozzle of claim 10, wherein the bottom surface of the nozzle outlet extends perpendicular to the gravity vector.

* * * * *